F. Wittram.
Harvester Cutter.
No. 98,456.                                              Patented Dec. 28, 1869.
Fig. 1.
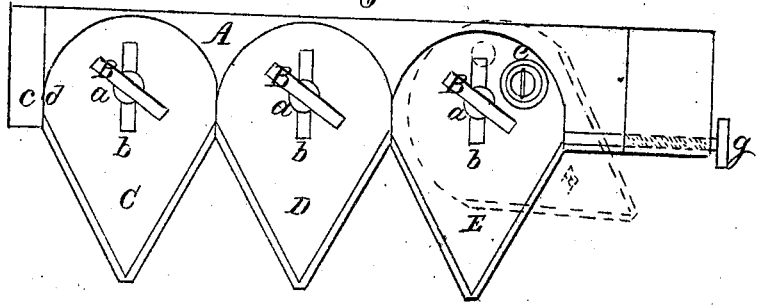
Fig. 2.
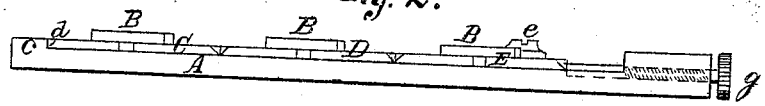
Fig. 3.
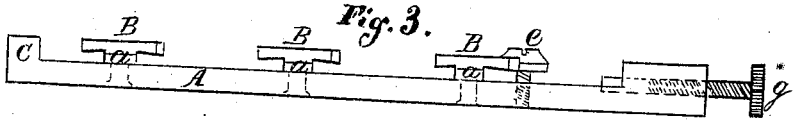
Fig. 4.          Fig. 5.
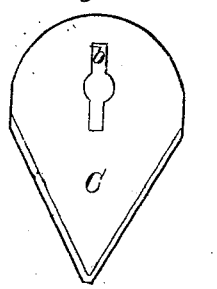 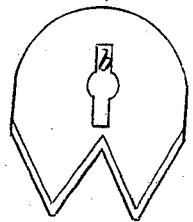
WITNESSES.
Edw. F. Brown
C. Bestor
Frederick Wittram
INVENTOR.

UNITED STATES PATENT OFFICE.

FREDERICK WITTRAM, OF SAN FRANCISCO, CALIFORNIA.

IMPROVEMENT IN HARVESTER-CUTTERS.

Specification forming part of Letters Patent No. 98,456, dated December 28, 1869.

*To all whom it may concern:*

Be it known that I, FREDERICK WITTRAM, of the city and county of San Francisco, in the State of California, have invented certain new and useful Improvements in Harvesting and Mowing Machine Cutters, of which the following is a full and exact description, reference being made to the accompanying drawings, making part of this specification, in which—

Figure 1 represents a plan view of a portion of the cutter-bar with the cutters attached; Fig. 2, a front view of Fig. 1; Fig. 3, a front view of the cutter-bar without the cutters; Fig. 4, a plan view of one of the cutters detached; Fig. 5, a modification of Fig. 4.

The letters of reference indicate the same parts in the different figures.

My invention relates to a new and improved mode of attaching the cutters to the cutter-bar, which admits of their convenient removal for the purpose of grinding or sharpening or replacement when worn or injured.

A is the cutter bar, which has secured to its upper surface the T-pieces B. These are placed equidistant from each other in a line parallel to the front of the bar and at a distance from center to center equal to the width of one of the cutters. The shafts or vertical parts $a$ of the T-pieces are circular in their horizontal section from the cutter-bar to a height equal to the thickness of the cutters, and act as pivots therefor.

C, D, and E are the cutters, each made separately, as shown in Fig. 4, with the cutting-edges at an acute angle; or they may be formed with any desired angle; or each cutter may be formed with two or more cutting-teeth, as shown in Fig. 5. The rear ends of the cutters, which rest on the cutter-bar, are rounded off sufficiently to enable them to revolve on their pivots $a$ a sufficient distance, which in the present instance will be about sixty degrees. Each cutter is provided with a slot, $b$, of a proper size and shape to fit the T and its circular shaft $a$.

The position of the slots or T-pieces in relation to the cutter-bar can be varied from that shown in the drawings, so as to admit the removal of any individual cutter without taking off the others, by moving the cutter E a sufficient distance on its axis of rotation in the direction shown in dotted lines at E, and so on in succession until the cutter to be removed is reached, when it can be disconnected from the T. The parts being formed as above described, the teeth are attached to the cutter-bar A in the following manner, viz:

The cutter C is first placed with its slot corresponding with its T-piece B, which in this instance is rigidly fastened, but may be made movable in the position indicated in dotted lines at E, resting on the cutter-bar. It is then turned upon the pivot $a$ until the straight portion $d$ of its side comes in close contact with the shoulder $c$, the arms of the T-pieces crossing the slots and holding the cutter firmly to the bar A. D is then put on in the same manner, one of its sides coming in contact with the corresponding part of C, already in position.

Any required number of cutters can be put on by the same means, requiring no other fastening than the T crossing the slot, and their contact with their immediate neighbors on both sides, excepting the last one of the series, which is represented by E. This must be held in position by auxiliary means, such as the screw or bolt $e$, set-screw $g$, or by any other convenient device.

The grinding of cutters for harvesters and mowing-machines, where they are all formed upon one piece of metal, is a troublesome operation, requiring special machinery, and when one or more teeth are broken by contact with stones, stumps, &c., or by any other accident, the whole machine is disabled until a new set is obtained; but by the simple and convenient devices above described the cutters can be removed and replaced at a minimum cost of both money and time, and be ground upon the common grindstone found upon almost every farm.

Having thus fully described my improvements, what I claim as my invention, and desire to secure by Letters Patent, is—

The combination of the slotted cutters, the T-pieces, and cutter-bar, arranged to operate substantially as described.

FREDERICK WITTRAM.

Witnesses:
EDM. F. BROWN,
C. BESTOR.